US010830539B2

(12) United States Patent
Dornseif et al.

(10) Patent No.: US 10,830,539 B2
(45) Date of Patent: Nov. 10, 2020

(54) HEAT EXCHANGER WITH ADAPTER

(71) Applicant: Modine Manufacturing Company, Racine, WI (US)

(72) Inventors: Marius Dornseif, Filderstadt (DE); Thomas Eckert, Waldenbuch (DE); Frank Becker, Tuebingen (DE)

(73) Assignee: MODINE MANUFACTURING COMPANY, Racine, WI (US)

( * ) Notice: Subject to any disclaimer, the term of this patent is extended or adjusted under 35 U.S.C. 154(b) by 0 days.

(21) Appl. No.: 15/753,347

(22) PCT Filed: Aug. 18, 2016

(86) PCT No.: PCT/US2016/047456
§ 371 (c)(1),
(2) Date: Feb. 19, 2018

(87) PCT Pub. No.: WO2017/031264
PCT Pub. Date: Feb. 23, 2017

(65) Prior Publication Data
US 2018/0245858 A1 Aug. 30, 2018

(30) Foreign Application Priority Data
Aug. 20, 2015 (DE) .......................... 10 2015 010 885

(51) Int. Cl.
*F28D 9/00* (2006.01)
*F28F 9/02* (2006.01)
(Continued)

(52) U.S. Cl.
CPC ........ *F28D 9/0056* (2013.01); *F02B 29/0462* (2013.01); *F28D 9/0043* (2013.01);
(Continued)

(58) Field of Classification Search
CPC ................. F28D 9/0056; F28D 9/0043; F28D 2021/0082; F02B 29/0462; F28F 27/00; F28F 9/0253; Y02T 10/146
See application file for complete search history.

(56) References Cited

U.S. PATENT DOCUMENTS 2,511,084 A * 6/1950 Shaw .................... F28D 9/0043
165/166
3,139,131 A * 6/1964 Hutchinson ............ B65D 15/18
220/792
(Continued)

FOREIGN PATENT DOCUMENTS

CN       103206321 A       7/2013
DE       102013005806 A1   10/2014
(Continued)

OTHER PUBLICATIONS

International Search Report and Written Opinion for Application No. PCT/US20161047456 dated Apr. 11, 2016 (15 pages).
(Continued)

*Primary Examiner* — Ljiljana V. Ciric
(74) *Attorney, Agent, or Firm* — Jeroen Valensa; Michael Bergnach

(57) ABSTRACT

A liquid cooler having a heat exchanger core located within a housing, the heat exchanger core secured to the housing by fastening points on the housing. The heat exchanger core having a stack of plate pairs or tubes, and the core also having ribs arranged in between the plate pairs or tubes. A cover plate with apertures is arranged on the heat exchanger core. The heat exchanger core is located within an insertion opening of the housing. An adapter rests on the cover plate in a sealing manner. The adapter includes at least one of an inlet port and an outlet port. The adapter is fastened to the
(Continued)

housing at the fastening points, and provides a fluid connection to the apertures and the tubes or plate pairs.

20 Claims, 4 Drawing Sheets

(51) Int. Cl.
F28F 27/00 (2006.01)
F02B 29/04 (2006.01)
F28D 21/00 (2006.01)

(52) U.S. Cl.
CPC ............ *F28F 9/0253* (2013.01); *F28F 27/00* (2013.01); *F28D 2021/0082* (2013.01); *Y02T 10/146* (2013.01)

(56) References Cited

U.S. PATENT DOCUMENTS

| | | | | |
|---|---|---|---|---|
| 3,334,399 | A * | 8/1967 | Teeguarden | F28D 9/0075 29/890.039 |
| 3,743,011 | A * | 7/1973 | Frost | F01M 1/10 165/283 |
| 4,011,905 | A | 3/1977 | Millard | |
| 4,561,494 | A * | 12/1985 | Frost | F28D 9/0012 165/109.1 |
| 5,078,209 | A * | 1/1992 | Kerkman | F28D 9/0012 165/167 |
| 5,472,045 | A * | 12/1995 | Poehlman | B01D 29/036 123/196 A |
| 5,575,329 | A * | 11/1996 | So | F28D 9/0012 123/196 AB |
| 5,765,632 | A * | 6/1998 | Gire | F28D 9/0012 165/167 |
| 5,896,834 | A * | 4/1999 | Gruner | F28D 9/005 123/196 AB |
| 6,332,495 | B1 | 12/2001 | Jamison et al. | |
| 6,401,670 | B2 | 6/2002 | Frunzetti et al. | |
| 7,306,030 | B2 * | 12/2007 | Luvisotto | F16K 15/16 137/454.2 |
| 7,921,905 | B2 * | 4/2011 | Baylis | B29C 66/1222 165/172 |
| 8,016,025 | B2 | 9/2011 | Brost et al. | |
| 8,286,615 | B2 * | 10/2012 | Dehnen | F02B 29/0462 123/184.21 |
| 8,651,170 | B2 * | 2/2014 | Maeda | F28D 7/0041 165/152 |
| 8,671,919 | B2 | 3/2014 | Nakasugi et al. | |
| 9,175,596 | B2 * | 11/2015 | Eilemann | F02B 29/0462 |
| 9,383,144 | B2 * | 7/2016 | Stoll | F01M 5/002 |
| 9,618,283 | B2 * | 4/2017 | Kalbacher | F16L 21/035 |
| 9,897,384 | B2 * | 2/2018 | Odillard | F02M 35/112 |
| 9,970,717 | B2 * | 5/2018 | Ignjatovic | F02B 29/0425 |
| 10,337,801 | B2 * | 7/2019 | Meshenky | F28F 9/08 |
| 10,451,362 | B2 * | 10/2019 | Kinder | F28F 9/005 |
| 10,619,946 | B2 * | 4/2020 | Meshenky | F28F 9/0253 |
| 10,634,431 | B2 * | 4/2020 | Shiozawa | F28F 9/0278 |
| 10,641,559 | B2 * | 5/2020 | Yoo | F28F 9/001 |
| 2003/0121649 | A1 | 7/2003 | Seiler et al. | |
| 2006/0278377 | A1 | 12/2006 | Martins et al. | |
| 2007/0175617 | A1 | 8/2007 | Brost et al. | |
| 2008/0000625 | A1 * | 1/2008 | Baylis | B29C 65/02 165/173 |
| 2008/0173436 | A1 * | 7/2008 | Baylis | F02B 29/0462 165/173 |
| 2010/0032149 | A1 * | 2/2010 | Roll | F28D 1/05366 165/175 |
| 2010/0089548 | A1 * | 4/2010 | Braic | F28D 7/1692 165/51 |
| 2010/0096101 | A1 * | 4/2010 | Braun | F02B 29/0462 165/41 |
| 2011/0168365 | A1 * | 7/2011 | Garret | F02B 29/0462 165/148 |
| 2012/0285423 | A1 * | 11/2012 | Nguyen | F28F 9/002 123/542 |
| 2013/0213621 | A1 * | 8/2013 | Pierre | F28D 9/0043 165/166 |
| 2014/0000569 | A1 * | 1/2014 | Eilemann | F02B 29/0462 123/542 |
| 2014/0050465 | A1 * | 2/2014 | Kominami | B60H 1/2221 392/482 |
| 2014/0130764 | A1 * | 5/2014 | Saumweber | F02B 29/045 123/184.21 |
| 2014/0138071 | A1 * | 5/2014 | Odillard | F02B 29/0475 165/164 |
| 2014/0299295 | A1 | 10/2014 | Kalbacher et al. | |
| 2014/0300105 | A1 * | 10/2014 | Kalbacher | F16L 21/035 285/351 |
| 2015/0047818 | A1 | 2/2015 | Peskos et al. | |
| 2015/0129164 | A1 * | 5/2015 | Ollier | F28F 9/00 165/67 |
| 2015/0184952 | A1 * | 7/2015 | Ignjatovic | F02B 29/0425 165/158 |
| 2016/0245597 | A1 * | 8/2016 | Meshenky | F28D 9/005 |
| 2016/0320140 | A1 * | 11/2016 | Meshenky | F28F 9/12 |
| 2017/0108283 | A1 * | 4/2017 | Devedeux | F02B 29/0462 |
| 2017/0160022 | A1 * | 6/2017 | Guengoer | F28F 9/001 |
| 2017/0268413 | A1 * | 9/2017 | Kinder | F28D 1/06 |
| 2019/0041137 | A1 * | 2/2019 | Stewart | F28F 9/001 |
| 2019/0154364 | A1 * | 5/2019 | Ollier | F28D 9/005 |
| 2019/0331021 | A1 * | 10/2019 | Whipple | F28D 7/16 |

FOREIGN PATENT DOCUMENTS

| | | | | |
|---|---|---|---|---|
| DE | 102015010885 A1 * | 2/2017 | ............ | F28F 9/0253 |
| EP | 2428759 A2 | 3/2012 | | |
| FR | 2985012 A1 | 6/2013 | | |
| WO | 2012101273 A1 | 8/2012 | | |

OTHER PUBLICATIONS

Notification of the First Office Action for Chinese Patent Application No. 201680046608.5, National Intellectual Propert Administration of the People's Republic of China, dated Jun. 10, 2019 (11 pages).

Supplementary European Search Report for EP Patent Application No. 16837799, European Patent Office, dated Mar. 29, 2019 (4 pages).

* cited by examiner

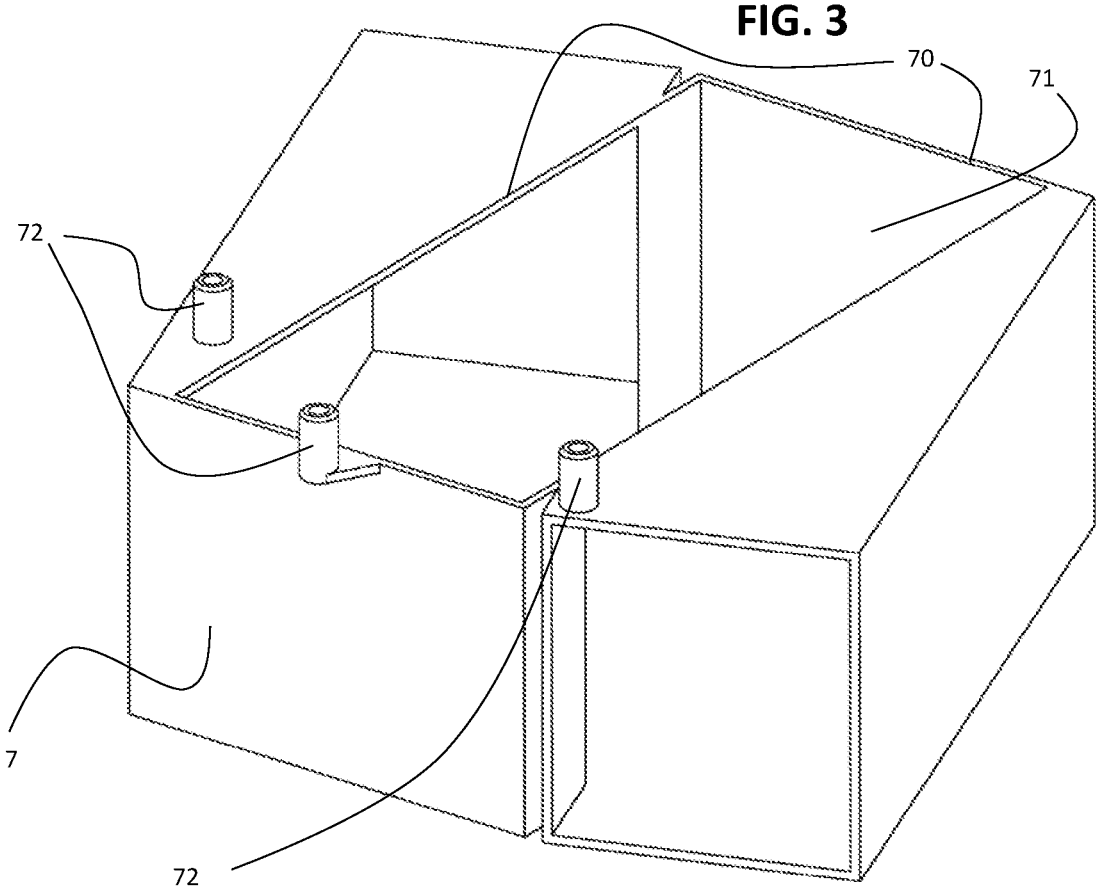
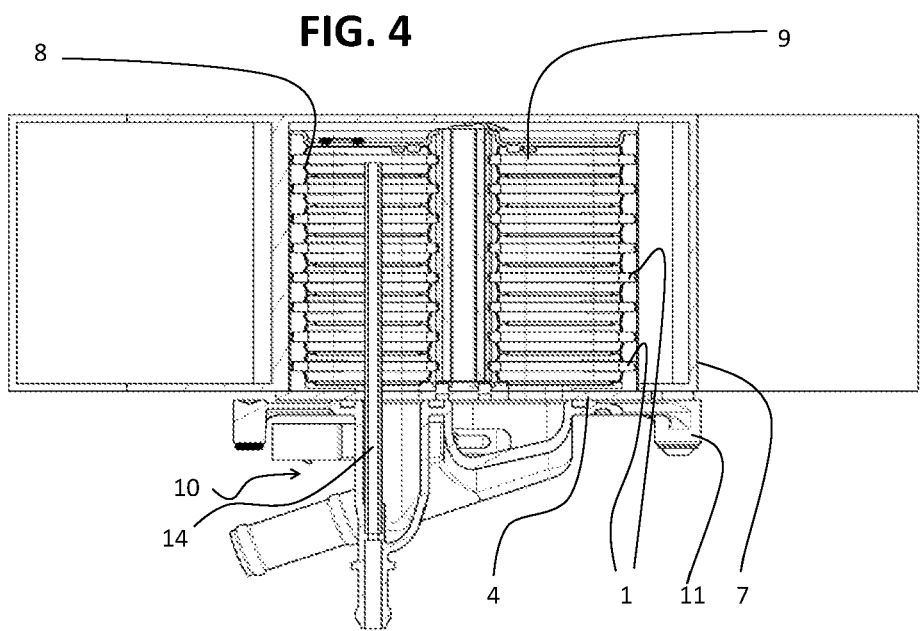

HEAT EXCHANGER WITH ADAPTER

CROSS-REFERENCE TO RELATED APPLICATIONS

This application claims priority to German Patent Application No. 10 2015 010 885.9 filed Aug. 20, 2015, the entire contents of which are hereby incorporated by reference herein.

FIELD OF THE INVENTION

The invention relates to a heat exchanger having a stack of plate pairs or tubes and ribs arranged in between, and having a cover plate having apertures on the stack, having an inlet port and an outlet port, wherein the heat exchanger is arranged in a housing and an edge of the cover plate is connected to an edge of an insertion opening in the housing. A method for producing this heat exchanger is also proposed.

BACKGROUND

The heat exchanger is known from German patent no. DE 10 2012 006 346 B4, the contents of which are incorporated by reference herein. Located on the cover plate of the known heat exchanger are an inlet port and an outlet port for introducing a cooling fluid through the apertures in the cover plate, which correspond to openings in broad sides of flat tubes, into or out of the flat tubes of the stack. The ports are brazed directly on the cover plate.

It is desirable for such heat exchangers to be equipped with functional elements such as sensors, vents or the like without the production costs thereof being substantially increased thereby.

SUMMARY

One problem addressed by the invention is to provide a heat exchanger which is equipped with functional elements, wherein the production of this heat exchanger is intended to be incorporated seamlessly into an existing process.

In one embodiment, as a result of the provision of an adapter, which is preferably produced from plastics material, the existing production process for the heat exchanger does not have to be changed. Once the stack, which has already been brazed in a brazing furnace, has been inserted into the housing and a weld has been formed between the edge of the cover plate and the edge of an insertion opening in the housing, the adapter is subsequently placed on the cover plate and fastened at fastening points on the housing by means of its cantilever arms.

In some embodiments the inlet port and/or the outlet port belong(s) to the adapter, which is sealed off with respect to the cover plate and provides a fluid connection to the apertures and the tubes.

The inventors note that—at least according to one preferred embodiment—the welding and brazing of the stack in a brazing furnace have been simplified since—in contrast to the abovementioned prior art—no disruptive metal ports that are also extensive and increase the brazed weight are present on the cover plate.

The invention is described in the following text in exemplary embodiments with reference to the appended drawings.

BRIEF DESCRIPTION OF THE DRAWINGS

FIG. 3 shows a housing without a heat exchanger.

FIG. 4 shows a section through the heat exchanger from FIG. 2, specifically in the region of an adapter, but illustrated in a manner rotated through 180°, corresponding to the intended installation position of the heat exchanger for example in an engine compartment of the motor vehicle.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The heat exchanger as shown in the exemplary embodiments is an intercooler by way of which compressed charge air is cooled by means of a liquid.

The specification of this use is not intended to rule out any other uses, in particular not to rule out those in which a gas is in heat exchange with the liquid.

Figure 1:
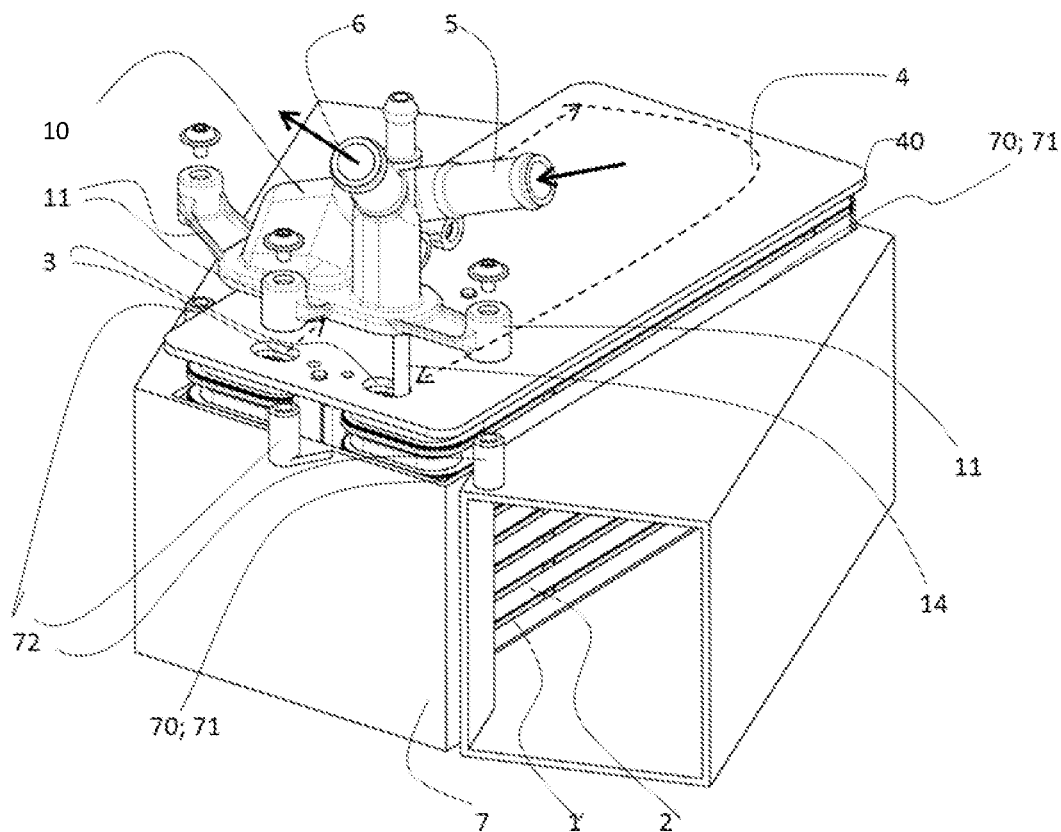
FIG. 1 shows an exploded perspective view of the as yet unfinished heat exchanger.
Figure 2:
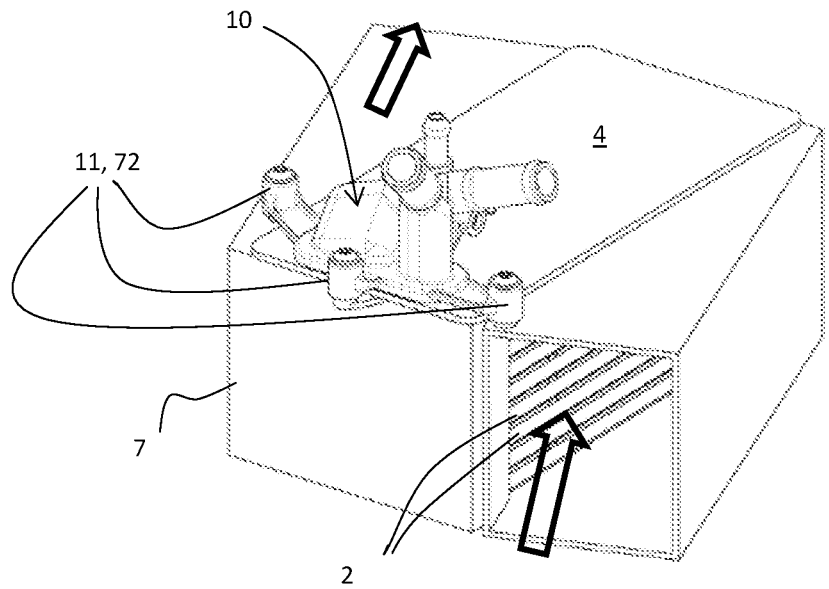
FIG. 2 shows the finished heat exchanger.

FIG. 1 or 2, but in particular FIG. 4, shows that the heat exchanger includes a stack of plate pairs forming tubes 1, and ribs 2 arranged in between. The tubes 1 can also be provided in some other way. To this end, reference can also be made to the prior art cited at the beginning, if necessary.

Figure 5:
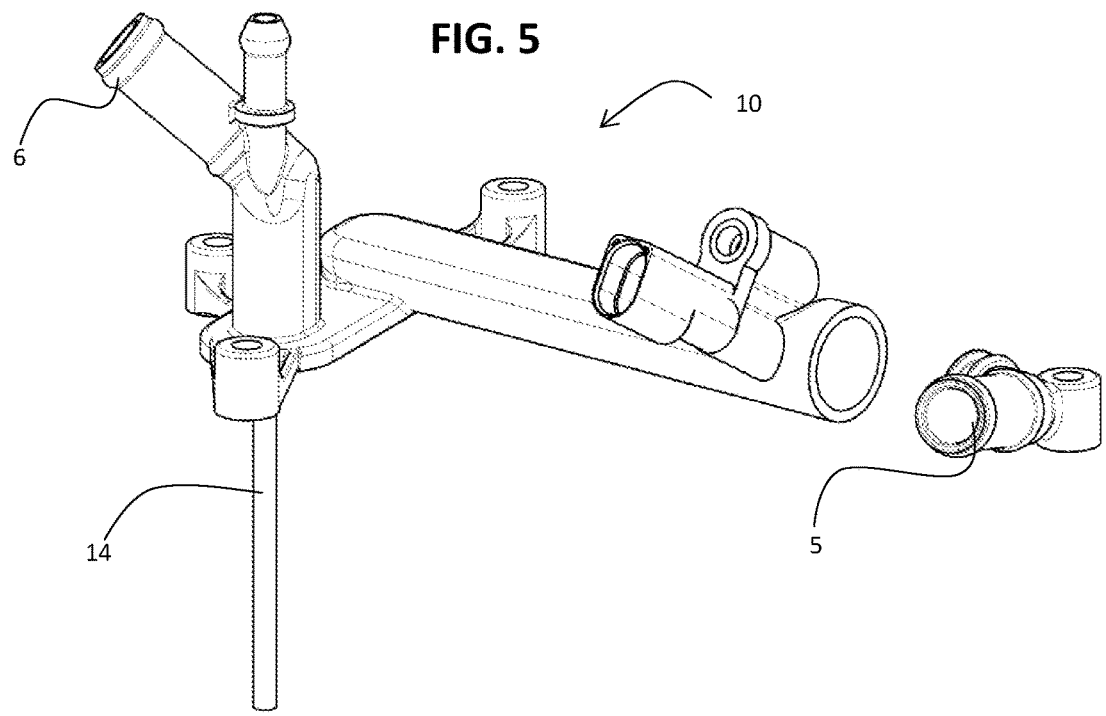
FIGS. 5-7 show perspective views of various adapters.
Figure 6:
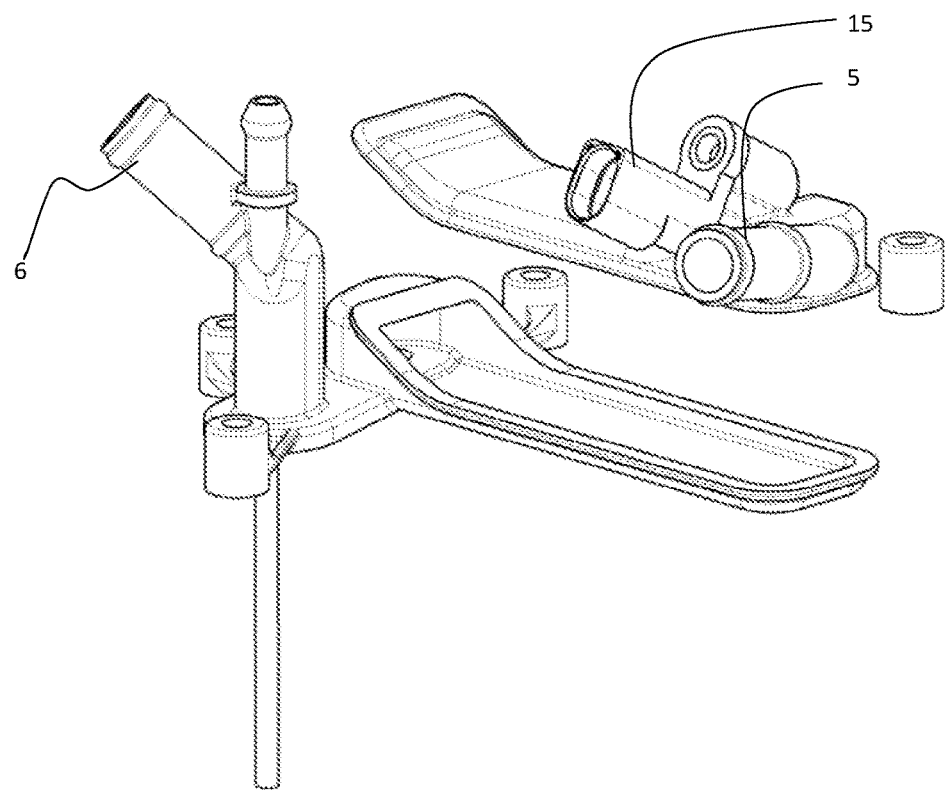

Located on the stack is a cover plate 4. The cover plate 4 has two apertures 3. Located above the cover plate 4 is an adapter 10. The adapter 10 is a part that is preferably produced as an injection-molded product preferably made of plastics material, although it can alternatively be produced as a cast metal part (e.g. a cast aluminum part). According to FIGS. 1, 2, and 7, the adapter 10 is in one part. FIGS. 5 and 6 show two-part variants. The adapter 10 contains an inlet port 5 and an outlet port 6 for the liquid. Furthermore, the adapter 10 contains ducts for providing a fluid connection into the heat exchanger and also back to the outlet port 6.

Figure 7:
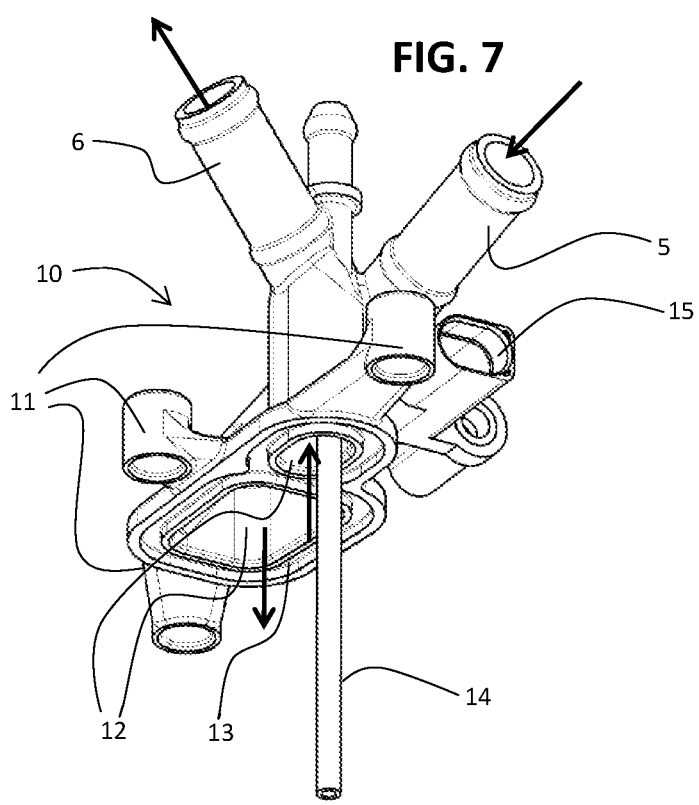

As can be seen from FIG. 7, the adapter 10 additionally has on its underside two openings 12, each having a seal 13 around its edges. The openings 12 correspond to the abovementioned apertures 3. As is known, further holes 15 (FIG. 4), which likewise correspond to the openings 12 and the apertures 3, are located in the plates 1, such that each plate pair or each tube, in particular each flat tube 1, of the stack can be flowed through by the liquid.

The charge air, symbolized by two arrows in FIG. 2, flows through the ribs 2 and is accordingly cooled. In FIG. 1, a dashed line having an arrow indicates an approximately U-shaped path of the liquid through the tubes 1.

The described adapter 10 is only mounted when the brazed stack has previously been inserted into an insertion opening 71 in a housing 7 and edge 40 of the cover plate 4 has been firmly connected to an edge 70 of the insertion opening 71, in particular connected thereto by means of a weld.

In addition to the already described features, the adapter 10 has cantilever arms 11, of which there are three in the exemplary embodiment, which serve to fasten the adapter 10 to the housing 7. Therefore, the housing 7 has been equipped with fastening points 72. The fastening points 72 can be formed for example in one pass with the production of the housing 7 and consequently this scarcely represents any additional effort. The fastening takes place by screwing on in the exemplary embodiment.

For the sake of simplicity, the exemplary embodiments show fastening points 72 which are arranged for instance level with the cover plate 4. Therefore, the cantilever arms 11 can extend beyond the edge 40 of the cover plate 4 without a bend or similar design. In embodiments that are not shown, the housing 7 has, by contrast, been adapted to restrictions, with the result that the fastening points 72 are also arranged for example beneath—in some cases also above—the level of the cover plate 4. In such cases, the cantilever arms 11 are formed with one or even with several bends or the like in order to reach the fastening points 72.

Certain advantages can be achieved by providing the fastening points 72 as a part of the housing 7. Such features are relatively easily produced through the net-shape production process by which the housing 7 is commonly formed, e.g. an aluminum casting process or a plastic injection molding process. The geometry of the fastening points 72 can thus be formed within that same process, thereby incurring no additional production steps and therefor only a negligible additional cost. Secondary operations such as, for example, a thread tapping operation may be required, but may also be avoided through the use of self-tapping screws to secure the adapter 10 to the fastening points 72.

In contrast, the inclusion of fastening points on the cover plate 4 of the heat exchanger 4 itself can be problematic. The cover plate 4 itself is usually too thin to adequately support screw threads, and furthermore the material is typically too soft after brazing to adequately support the loads imposed on such threads. Consequently, an additional component would need to be added to the heat exchanger itself in order to provide the requisite fastening points, thereby imposing additional cost and complexity.

As a further advantage, by providing the mounting locations as well as the inlet and outlet ports 5, 6 of the heat exchanger separately from the brazed heat exchanger core, additional flexibility with respect to the locations of those features can be achieved. This allows for the design of a common brazed heat exchanger core to be used across multiple variations of the cooler, with varying versions of the housing 7 and adapter 10 to meet the various packaging constraints of different applications.

Furthermore, the adapter 10 in the exemplary embodiments also has a venting tube 14 having an associated connection to the outside, in order to be able to discharge entrained gas from the liquid. In the exemplary embodiment, one end of the tube 14 is located at a point arranged at the top within an outlet space 8 formed in the stack (FIG. 4). In another exemplary embodiment, the inlet space 9 has been provided therefor. The venting tube 14 can take the form of a metal tube that is inserted into a corresponding portion of the adapter 10, as seen in the cross-section of FIG. 4. The associated connection to the outside is provided as a vent port fluidly connected to an end of the vent tube, to which a hose connection or the like can be attached.

The reference sign 15 denotes a temperature sensor which records the temperature of the liquid and can serve for performance-related adjustment, for example of the volumetric flow of the liquid. A corresponding space for the installation of the sensor 15 is a constituent part of the adapter 10. Such an additional function and possibly also other additional functions are easily provided by means of the adapter 10. As best seen in FIGS. 5-7, the temperature sensor 15 can include a receptacle that is integrated into the adapter 10 and that is specifically adapted to receive a standard thermocouple type probe (not shown). The probe portion of the temperature sensor 15 can be inserted into the receptacle portion of the temperature sensor 15 and can be sealingly attached thereto, with a sensing end of the probe disposed within the fluid space 8 or 9 in order to measure the temperature of the fluid within that space and deliver an electronic signal in proportion to that sensed temperature.

FIGS. 5 and 6 depict alternative embodiments of the adapter 10 wherein the adapter 10 is constructed of multiple (i.e. two or more) pieces. Such a construction of the adapter 10 can be advantageous in some circumstances as it can allow for more complex shapes that pose difficulties in being produced as a single component through, for example, plastic injection molding. The two or more components can be permanently joined together to form the unitary adapter 10 prior to assembly of the adapter 10 to the heat exchanger by, for example, gluing, ultrasonic welding, or the like. Alternatively, the components can be joined together in a releasable fashion. Such a multi-piece embodiment of the adapter 10 can be especially advantageous in applications where it is desirable to locate one of the ports (e.g. the inlet port 5 in the embodiments of FIGS. 5, 6) in a location that is somewhat remote from the corresponding aperture 3, as may be necessitated by space constraints in the installed condition. The duct provided by the adapter 10 between the remotely located port (the port 5 in the embodiments shown) and the corresponding aperture 3 extends parallel to a planar surface of the cover plate 4 over a portion of its length.

Figure 8:
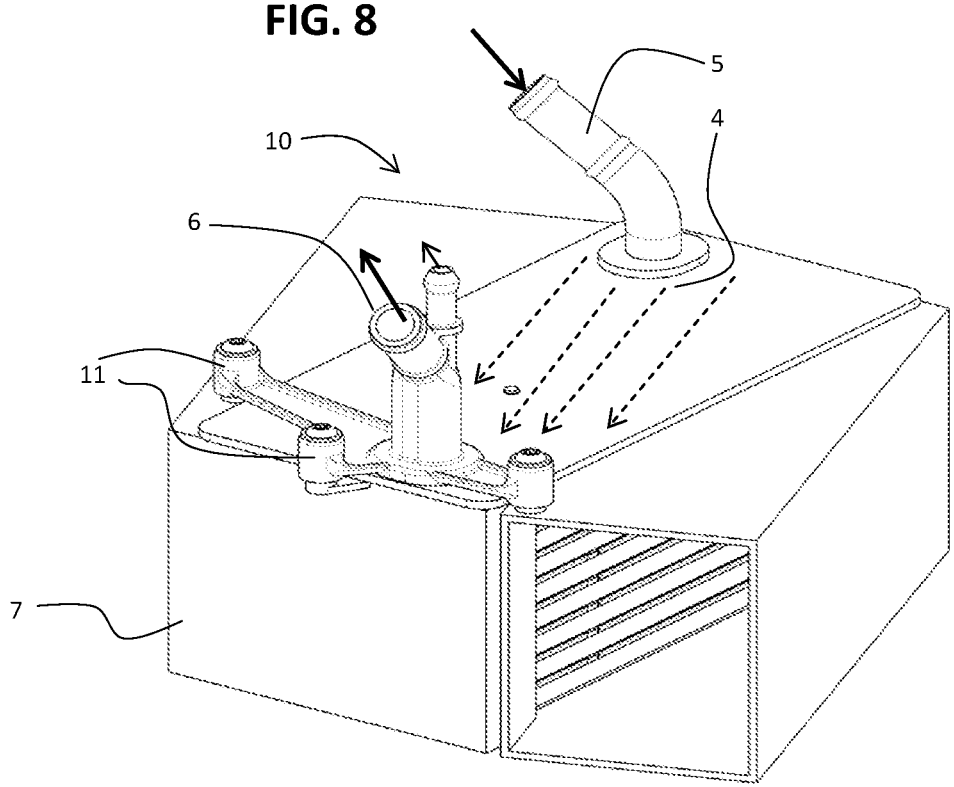
FIG. 8 shows a second exemplary embodiment.

In the exemplary embodiment according to FIG. 8—in contrast to the already described exemplary embodiment—only the outlet port 6 has been integrated in the adapter 10. The inlet port 5 is located on the cover plate 4. Said inlet port 5 could, however, also be located at some other location, for example on an opposite side of the stack. It is obvious that the two ports 5, 6 can also be exchanged, i.e. the adapter 10 could contain the inlet port 5 rather than the outlet port 6. The described and shown additional functions (venting 14, sensor 15, inter alia) of the adapter 10 are maintained.

As can be supposed from viewing FIG. 8, this exemplary embodiment requires a correspondingly modified plate design with a different through-flow characteristic (arrows) of the plate pairs or the tubes, this being known per se, however (not shown).

Various alternatives to the certain features and elements of the present invention are described with reference to specific embodiments of the present invention. With the exception of features, elements, and manners of operation that are mutually exclusive of or are inconsistent with each embodiment described above, it should be noted that the alternative features, elements, and manners of operation described with reference to one particular embodiment are applicable to the other embodiments. The described embodiments presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention.

What is claimed is:

1. A heat exchanger comprising:
   a stack of plate pairs or tubes, the stack having ribs arranged between the plate pairs or tubes;
   a cover plate located on the stack and having one or more apertures for flow of a fluid and a cover plate edge that bounds the cover plate;
   a housing at least partially surrounding the stack, the housing having an insertion opening and one or more fastening points; and
   an adapter disposed against the cover plate to fluidly seal the one or more apertures, and the adapter being fastened to the housing by the one or more fastening points,
   wherein the cover plate extends across the insertion opening, and
   wherein the cover plate edge is connected to the housing around the insertion opening.

2. The heat exchanger of claim 1, wherein the one or more apertures includes a first aperture to allow for fluid flow into the stack and a second aperture to allow for fluid flow out of the stack, and wherein the adapter comprises,
   an inlet port through which fluid can be received into the heat exchanger;
   an outlet port through which fluid can be removed from the heat exchanger;
   a first duct to fluidly connect the inlet port and the first aperture;
   a second duct to fluidly connect the outlet port and the second aperture;
   a first seal surrounding the first aperture; and
   a second seal surrounding the second aperture.

3. The heat exchanger of claim 2, wherein at least a portion of one of the first and second ducts extends parallel to a planar surface of the cover plate.

4. The heat exchanger of claim 1, wherein the cover plate edge is located between the insertion opening and the one or more fastening points of the housing.

5. The heat exchanger of claim 1, wherein the adapter includes one or more cantilevered arms, and wherein the adapter is secured to the one or more fastening points at ends of the one or more cantilevered arms.

6. The heat exchanger of claim 1, wherein the housing further comprises:
   an air inlet arranged at one end of the housing; and
   an air outlet arranged at another end of the housing,
   wherein a first one of the one or more fastening points is arranged at a first side of the insertion opening corresponding to the air inlet,
   wherein a second one of the one or more fastening points is arranged at a second side of the insertion opening corresponding to the air outlet, and
   wherein the stack is located between the air inlet and the air outlet.

7. The heat exchanger of claim 1, wherein the adapter includes a vent tube extending through the one or more apertures and a vent port fluidly connected to a first end of the vent tube.

8. The heat exchanger of claim 7, wherein a second end of the vent tube opposite the vent port is arranged at the top of a fluid space provided within the stack.

9. The heat exchanger of claim 1, further comprising a temperature sensor to measure a temperature of the fluid, wherein the temperature sensor is received into a receptacle integrated into the adapter.

10. The heat exchanger of claim 1, wherein
    the housing includes an air inlet, an air outlet, and an air flow path extending through the housing between the air inlet and the air outlet,
    wherein the ribs are located along the air flow path,
    wherein the cover plate is brazed to the stack at one end,
    wherein the adapter has a fluid inlet and a fluid outlet,
    wherein a fluid flow path extends between the fluid inlet and the fluid outlet and passes through the plate pairs or tubes, and
    wherein the cover plate and the adapter are separately fastened to the housing.

11. The heat exchanger of claim 10,
    wherein the fluid flow path extends through a first aperture of the one or more apertures to direct fluid from the adapter to the stack,
    wherein the fluid flow path extends through a second aperture of the one or more apertures to direct fluid from the stack to the adapter,
    wherein a first seal surrounds the first aperture to prevent leakage of the fluid as the fluid passes through the first aperture, and
    wherein a second seal surrounds the second aperture to prevent leakage of the fluid as the fluid passes through the second aperture.

12. The heat exchanger of claim 1, wherein the cover plate edge is welded to the housing completely around the insertion opening.

13. A heat exchanger comprising:
    a stack of tubes and ribs, the ribs being arranged between adjacent tubes;
    a housing extending at least partially around the stack and including an insertion opening;
    a cover plate extending across the insertion opening, the cover plate including a first aperture fluidly connected to the tubes; and
    an adapter sealed against the cover plate and fastened to the housing, the adapter including a first port fluidly connected to the first aperture,
    wherein the adapter extends beyond a first side of the stack to connect to the housing at a first location beyond the first side of the stack.

14. The heat exchanger of claim 13, wherein the cover plate completely covers the insertion opening and is continuously connected to the housing around the insertion opening.

15. The heat exchanger of claim 13, wherein the adapter extends beyond a second side of the stack to connect to the housing at a second location beyond the second side of the stack.

16. The heat exchanger of claim 15, wherein the adapter extends beyond a third side of the stack to connect to the housing at a third location beyond the third side of the stack.

17. A heat exchanger comprising,
    a stack of tubes and ribs, the ribs being arranged between adjacent tubes;
    a housing extending at least partially around the stack and including an insertion opening, a first fastening point, and a second fastening point;
    a cover plate extending across the insertion opening, the cover plate including a first aperture fluidly connected to the tubes; and an adapter including a main body sealed against the cover plate and sealed around the first aperture, a first port extending from the main body and fluidly connected to the first aperture, a first arm extending in a first direction from the main body to the first fastening point, and a second arm extending in a second direction from the main body to the second fastening point, wherein the first direction is different than the second direction, and wherein the first arm is separated from the second arm.

18. The heat exchanger of claim 17, wherein the first fastening point includes a first fastening hole, wherein the second fastening point includes a second fastening hole, wherein the first arm includes a first arm hole, wherein the second arm includes a second arm hole, wherein the first arm hole aligns with the first fastening hole, and wherein the second arm hole aligns with the second fastening hole.

19. The heat exchanger of claim 18, wherein the housing includes a first stub that extends from the first fastening hole and a second stub that extends from the second fastening hole, wherein the first arm includes a first receptacle that extends from the first arm hole, wherein the second arm includes a second receptable that extends from the second arm hole, wherein the first stub is located at least partially within the first receptacle, and wherein the second stub is located at least partially within the second receptacle.

20. The heat exchanger of claim 17, wherein the cover plate is directly joined to one of the ribs or to one of the tubes.

\* \* \* \* \*